United States Patent
Yang et al.

(10) Patent No.: US 9,985,763 B2
(45) Date of Patent: May 29, 2018

(54) METHOD FOR CONFIGURING CHANNEL STATE INFORMATION REFERENCE SIGNAL, AND BASE STATION

(71) Applicant: Huawei Technologies Co., Ltd., Shenzhen (CN)

(72) Inventors: Jing Yang, Shanghai (CN); Kainan Shao, Shenzhen (CN); Ni Ma, Shanghai (CN); Tuo Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 114 days.

(21) Appl. No.: 15/066,552

(22) Filed: Mar. 10, 2016

(65) Prior Publication Data
US 2016/0254893 A1    Sep. 1, 2016

Related U.S. Application Data

(63) Continuation of application No. PCT/CN2013/083334, filed on Sep. 11, 2013.

(51) Int. Cl.
*H04L 5/00* (2006.01)
*H04W 16/32* (2009.01)
(Continued)

(52) U.S. Cl.
CPC ........... *H04L 5/0051* (2013.01); *H04B 7/024* (2013.01); *H04B 7/0619* (2013.01);
(Continued)

(58) Field of Classification Search
CPC ... H04L 5/0051; H04L 5/0069; H04L 27/261; H04L 27/2611; H04L 27/2613;
(Continued)

(56) References Cited

U.S. PATENT DOCUMENTS

| | | |
|---|---|---|
| 2012/0322477 A1 | 12/2012 | Kang et al. |
| 2013/0044685 A1 | 2/2013 | Fong et al. |

(Continued)

FOREIGN PATENT DOCUMENTS

| | | |
|---|---|---|
| CN | 101668295 A | 3/2010 |
| CN | 102045762 A | 5/2011 |

(Continued)

OTHER PUBLICATIONS

"A CSI-RS configuration for channel Estimation and interference measurement", HTC, 3GPP TSG-RAN WG1 #68, Feb. 6-10, 2012, 3 pages, R1-120699.

(Continued)

*Primary Examiner* — Pao Sinkantarakorn

(57) ABSTRACT

The present invention discloses a method for configuring a channel state information reference signal, and a base station. The method includes: obtaining location information of a user equipment; determining, according to the location information, that the user equipment is located in a cross coverage area in which at least two nodes provide service, or in a centralized coverage area in which one node provides service; when it is determined that the user equipment is located in the cross coverage area, determining, according to transmitting capabilities of the at least two nodes and a receiving capability of the user equipment, the number of ports for sending downlink signals to the user equipment; and sending CSI-RS configuration information to the user equipment, where the CSI-RS configuration information includes the number of ports.

18 Claims, 8 Drawing Sheets

(51) Int. Cl.
*H04B 7/06* (2006.01)
*H04B 7/024* (2017.01)
*H04L 27/26* (2006.01)
*H04W 64/00* (2009.01)
*H04W 72/04* (2009.01)
*H04W 48/10* (2009.01)
*H04W 88/08* (2009.01)

(52) U.S. Cl.
CPC ......... *H04L 27/2613* (2013.01); *H04W 16/32* (2013.01); *H04W 64/00* (2013.01); *H04W 72/042* (2013.01); *H04W 48/10* (2013.01); *H04W 88/08* (2013.01)

(58) Field of Classification Search
CPC ..... H04B 7/024; H04B 7/0626; H04W 64/00; H04W 72/042; H04W 88/08
See application file for complete search history.

(56) References Cited

U.S. PATENT DOCUMENTS

| | | |
|---|---|---|
| 2013/0343216 A1 | 12/2013 | Su et al. |
| 2014/0200012 A1 | 7/2014 | Ito |
| 2014/0369291 A1 | 12/2014 | Zhang et al. |
| 2015/0003271 A1* | 1/2015 | Park ................... H04L 27/2613 370/252 |

FOREIGN PATENT DOCUMENTS

| | | |
|---|---|---|
| CN | 102546110 A | 7/2012 |
| CN | 102783049 A | 11/2012 |
| CN | 103220703 A | 7/2013 |
| EP | 2 493 090 A2 | 8/2012 |
| JP | 2007318729 A | 12/2007 |
| JP | 2011234299 A | 11/2011 |
| RU | 2011131777 A | 4/2013 |
| WO | WO 2011/100520 A1 | 8/2011 |
| WO | WO 2012/062154 A1 | 5/2012 |
| WO | WO 2013/051089 | 4/2013 |

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.5.0, Jun. 2012, 101 pages.

"3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 108 pages.

Fujitsu, "CSI-RS configuration for CSI reporting" [online], 3GPP TSG RAN WG1, Meeting #68, R1-120761, Feb. 6-10, 2012, Dresden, Germany, 4 pages.

* cited by examiner

100

Determine a CSI-RS resource configuration sequence number of a user equipment according to a resource that is configured for a coordinated user equipment and is multiplexed into a resource configured for a first non-coordinated user equipment and a second non-coordinated user equipment, where the user equipment belongs to the coordinated user equipment, the first non-coordinated user equipment, or the second non-coordinated user equipment, the coordinated user equipment includes a user equipment located in a cross coverage area in which a first node and a second node provide service, the first non-coordinated user equipment includes a user equipment located in a centralized coverage area in which the first node provides service, and the second non-coordinated user equipment includes a user equipment located in a centralized coverage area in which the second node provides service ~ S150

Send CSI-RS configuration information to the user equipment, where the CSI-RS configuration information includes the CSI-RS resource configuration sequence number of the user equipment ~ S141

FIG. 3

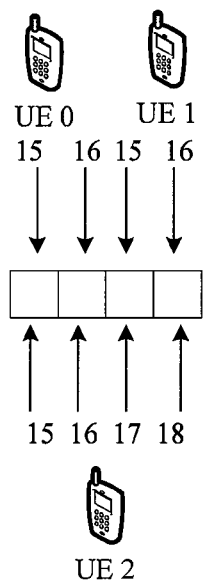

METHOD FOR CONFIGURING CHANNEL STATE INFORMATION REFERENCE SIGNAL, AND BASE STATION

CROSS-REFERENCE TO RELATED APPLICATIONS

This application is a continuation of International Application No. PCT/CN2013/083334, filed on Sep. 11, 2013, which is hereby incorporated by reference in its entirety.

TECHNICAL FIELD

The present invention relates to the field of communications, and in particular, to a method for configuring a channel state information reference signal, and a base station.

BACKGROUND

A multiple-input multiple-output (Multiple Input Multiple Output, MIMO) technology is one of effective measures for enhancing spectrum efficiency of a radio communications system. For frequency division duplexing (Frequency Division Duplexing, FDD), precoding is generally combined with a limited feedback technology to obtain a transmitting array gain and implement inter-stream interference suppression, so as to achieve objectives of space multiplexing and improving a signal-to-noise ratio of received signals.

A precoding matrix or vector is obtained by a receiving side by measuring a common pilot or a measurement pilot, and is then fed back to a transmitting side by using signaling. The transmitting side performs corresponding MIMO transmission according to the precoding matrix or vector that is fed back.

For a current long term evolution (Long Term Evolution, LTE) system, a terminal may perform measurement by using a channel state information reference signal (Channel State Information reference signals, CSI-RS) and a cell-specific reference signal (Cell-specific Reference Signals, CRS). In an LTE FDD R8 (Release 8) protocol version, the terminal performs relevant precoding matrix indicator (Precoding Matrix Indicator, PMI) measurement by using a CRS. In a protocol of a version later than R9 (Release 9), a demodulation reference signal (Demodulation Reference Signal, DMRS) and a CSI-RS are introduced. A DMRS pilot is a user equipment (User Equipment, UE)-specific demodulation pilot. In both precoding and beamforming (Beamforming), a transmitting weight is borne by the DMRS pilot. A CSI-RS pilot is a measurement pilot, and is used for a UE to perform downlink channel measurement, including PMI measurement and channel quality indicator (Channel Quality Indicator, CQI) measurement.

As described in the LTE protocol, all CSI-RS-related parameters, such as the number of CSI-RS ports, a CSI-RS resource configuration sequence number, and a CSI-RS subframe configuration, can be delivered to the UE by using higher-layer signaling, which means that a CSI-RS may undergo user-level configuration. However, considering a limitation imposed by the protocol onto a configuration format of the CSI-RS, the CSI-RS is actually also a cell-level configuration. A main purpose of introducing higher-layer signaling to implement user-level CSI-RS configuration is to distinguish between measurement behaviors of UEs that support different protocol versions. For example, if a terminal that supports R8 and a terminal that supports R10 exist in a network, the terminal that supports R8 needs only to perform measurement on the CRS pilot, and does not need to perform CSI-RS configuration; but for the terminal that supports R10, with an increase in the number of transmitting antennas of a system, system overhead can be reduced by introducing the CSI-RS pilot, and therefore, for such type of UE, it is necessary to enable CSI-RS configuration and transmission.

Compared with an existing conventional macro site system, the foregoing technologies are a set of relatively complete solution. However, with continuous evolution of the LTE system, application of CSI-RS-related technologies similar to the foregoing may cause quite a number of additional problems to systems such as a heterogeneous network (Hetnet), a coordinated multi-point transmission (Coordinative Multiple-Point, CoMP) system, and a distributed antenna system (Distributed Antenna System, DAS).

For a CoMP system, if dependent JT transmission of multi-cell coordination needs to be implemented for a user at a cell edge, two coordinated cells need to implement user-level regular adjustment to implement signal synchronization between coordinated ports, and in addition, the UE needs to feed back phase difference information of signals of the two cells, which means a significant increase in system feedback overhead. Therefore, in a case where the phase difference information is unavailable, only independent JT transmission can be implemented.

In the current conventional MIMO technology, with given specifications of the transmitting antenna, the system determines the number of transmitting ranks (the number of ranks) according to the number of receiving antennas of the UE and a current channel state. For data at each rank, all antennas at a transmitting end participate in transmission. In a conventional MIMO system, the number of transmitting antennas visible to the UE is fixed, and all UEs in the system have the same number of transmitting antennas. After the number of transmitting antennas is determined, the system may deliver the CSI-RS pilot configuration to the UE by using higher-layer signaling. The UE may find, according to its own CSI-RS configuration, a corresponding pilot location to perform downlink channel measurement, and feed back information that is obtained by means of measurement, such as the PMI and CQI, to the transmitting side. The transmitting side selects a corresponding precoding matrix according to the PMI information fed back, and transmits weight information together with data signals to the UE by using a DMRS pilot. The UE performs channel estimation according to the DMRS pilot, so as to obtain the weight information for data demodulation. In addition, the transmitting end may also adjust a modulation manner and the number of ranks according to the information fed back by the UE, such as the CQI, so as to better match the current channel state.

The R10 protocol provides a CSI-RS configuration method and a resource mapping manner, and, under a condition of a fixed number of transmitting antennas, provides various cell-level CSI-RS configuration and resource mapping manners. However, to implement coordinated transmission in scenarios such as a distributed small-cell base station system, a remote antenna, or multiple virtual sectors, for a terminal in a service area, the number of system-side antennas or ports required by a user in single-site transmission may be different from that required by a user in coordinated transmission, but the existing protocol standard does not provide a corresponding user-level CSI-RS configuration method for the CoMP technology in such scenarios.

SUMMARY

In view of this, embodiments of the present invention provide a method for configuring a channel state information reference signal, and a base station, which can perform user-level CSI-RS configuration.

According to a first aspect, a method for configuring a channel state information reference signal is provided and includes: obtaining location information of a user equipment; determining, according to the location information, that the user equipment is located in a cross coverage area in which at least two nodes provide service, or in a centralized coverage area in which one node provides service; when it is determined that the user equipment is located in the cross coverage area, determining, according to transmitting capabilities of the at least two nodes and a receiving capability of the user equipment, the number of ports for sending downlink signals to the user equipment; and sending CSI-RS configuration information to the user equipment, where the CSI-RS configuration information includes the number of ports.

With reference to the first aspect, in a first possible implementation manner of the first aspect, the determining the number of ports for sending downlink signals to the user equipment includes: when it is determined that the user equipment is located in the centralized coverage area, determining, according to a transmitting capability of the node that provides service in the centralized coverage area, the number of ports for sending downlink signals to the user equipment.

With reference to the first aspect or the first possible implementation manner of the first aspect, in a second possible implementation manner of the first aspect, the method further includes: determining a CSI-RS resource configuration sequence number of the user equipment according to a resource that is configured for a coordinated user equipment and is multiplexed into a resource configured for a first non-coordinated user equipment and a second non-coordinated user equipment, where the user equipment belongs to the coordinated user equipment, the first non-coordinated user equipment, or the second non-coordinated user equipment, the coordinated user equipment includes the user equipment located in the cross coverage area in which a first node and a second node provide service, the first non-coordinated user equipment includes the user equipment located in the centralized coverage area in which the first node provides service, and the second non-coordinated user equipment includes the user equipment located in the centralized coverage area in which the second node provides service; and the sending CSI-RS configuration information to the user equipment includes: sending the CSI-RS configuration information to the user equipment, where the CSI-RS configuration information further includes the CSI-RS resource configuration sequence number of the user equipment.

With reference to the second possible implementation manner of the first aspect, in a third possible implementation manner of the first aspect, when the user equipment belongs to the first non-coordinated user equipment or the second non-coordinated user equipment, the method further includes: when mapping a data signal of the first non-coordinated user equipment, performing a zeroing operation for power of the data signal of the first non-coordinated user equipment on a resource element RE that bears a CSI-RS of the second non-coordinated user equipment; and when mapping a data signal of the second non-coordinated user equipment, performing a zeroing operation for power of the data signal of the second non-coordinated user equipment on an RE that bears a CSI-RS of the first non-coordinated user equipment.

With reference to the second possible implementation manner of the first aspect, in a fourth possible implementation manner of the first aspect, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table A:

TABLE A

|  | Coordinated UE | First non-coordinated UE | Second non-coordinated UE |
|---|---|---|---|
| CSI-RS resource configuration sequence number | 0 | 0 | 10 |
|  | 1 | 1 | 12 |
|  | 2 | 2 | 14 |
|  | 3 | 3 | 16 |
|  | 4 | 4 | 18 |
|  | 5 | 5 | 11 |
|  | 6 | 6 | 13 |
|  | 7 | 7 | 15 |
|  | 8 | 8 | 17 |
|  | 9 | 9 | 19 | where, a frame structure for sending downlink signals to the user equipment adopts a normal cyclic prefix and is a frame structure applicable to type 1 and type 2.

With reference to the second possible implementation manner of the first aspect, in a fifth possible implementation manner of the first aspect, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table B:

TABLE B

|  | Coordinated UE | First non-coordinated UE | Second non-coordinated UE |
|---|---|---|---|
| CSI-RS resource configuration sequence number | 20 | 26 | 20 |
|  | 21 | 28 | 21 |
|  | 22 | 30 | 22 |
|  | 23 | 27 | 23 |
|  | 24 | 29 | 24 |
|  | 25 | 31 | 25 | where, a frame structure for sending downlink signals to the user equipment adopts a normal cyclic prefix and is a frame structure applicable only to type 1.

With reference to the second possible implementation manner of the first aspect, in a sixth possible implementation manner of the first aspect, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table C:

TABLE C

|  | Coordinated UE | First non-coordinated UE | Second non-coordinated UE |
|---|---|---|---|
| CSI-RS resource configuration sequence number | 0 | 0 | 8 |
|  | 1 | 1 | 9 |
|  | 2 | 2 | 12 |
|  | 3 | 3 | 13 |
|  | 4 | 4 | 10 |
|  | 5 | 5 | 11 |
|  | 6 | 6 | 14 |
|  | 7 | 7 | 15 | where, a frame structure for sending downlink signals to the user equipment adopts an extended cyclic prefix and is a frame structure applicable to type 1 and type 2.

With reference to the second possible implementation manner of the first aspect, in a seventh possible implementation manner of the first aspect, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table D:

TABLE D

|  | Coordinated UE | First non-coordinated UE | Second non-coordinated UE |
|---|---|---|---|
| CSI-RS resource configuration sequence number | 20 | 20 | 26 |
|  | 21 | 21 | 27 |
|  | 22 | 22 | 28 |
|  | 23 | 23 | 29 |
|  | 24 | 24 | 30 |
|  | 25 | 25 | 31 | where, a frame structure for sending downlink signals to the user equipment adopts an extended cyclic prefix and is a frame structure applicable only to type 1.

With reference to the second possible implementation manner of the first aspect, in an eighth possible implementation manner of the first aspect, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table E:

TABLE E

|  | Coordinated UE | First non-coordinated UE | Second non-coordinated UE |
|---|---|---|---|
| CSI-RS resource configuration sequence number | 0 | 5 | 0 |
|  | 1 | 6 | 1 |
|  | 2 | 7 | 2 |
|  | 3 | 8 | 3 |
|  | 4 | 9 | 4 | where, a frame structure for sending downlink signals to the user equipment adopts a normal cyclic prefix and is a frame structure applicable to type 1 and type 2.

With reference to the second possible implementation manner of the first aspect, in a ninth possible implementation manner of the first aspect, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table F:

TABLE F

|  | Coordinated UE | First non-coordinated UE | Second non-coordinated UE |
|---|---|---|---|
| CSI-RS resource configuration sequence number | 20 | 3 | 0 |
|  | 21 | 4 | 1 |
|  | 22 | 5 | 2 | where, a frame structure for sending downlink signals to the user equipment adopts a normal cyclic prefix and is a frame structure applicable only to type 1.

With reference to the second possible implementation manner of the first aspect, in a tenth possible implementation manner of the first aspect, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table G:

TABLE G

|  | Coordinated UE | First non-coordinated UE | Second non-coordinated UE |
|---|---|---|---|
| CSI-RS resource configuration sequence number | 0 | 4 | 0 |
|  | 1 | 5 | 1 |
|  | 2 | 6 | 2 |
|  | 3 | 7 | 3 | where, a frame structure for sending downlink signals to the user equipment adopts an extended cyclic prefix and is a frame structure applicable to type 1 and type 2.

With reference to the second possible implementation manner of the first aspect, in an eleventh possible implementation manner of the first aspect, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table H:

TABLE H

|  | Coordinated UE | First non-coordinated UE | Second non-coordinated UE |
| --- | --- | --- | --- |
| CSI-RS resource configuration sequence number | 20 21 22 | 23 24 25 | 20 21 22 | where, a frame structure for sending downlink signals to the user equipment adopts an extended cyclic prefix and is a frame structure applicable only to type 1.

With reference to the first aspect or any one of the possible implementation manners from the first to the eleventh possible implementation manners of the first aspect, in a twelfth possible implementation manner of the first aspect, the method further includes: determining an initial value of a CSI-RS sequence, where the initial value of the CSI-RS sequence is determined according to the following equation:

$$c_{init}=2^{10} \cdot (7 \cdot (n_s+1)+l+1) \cdot (2 \cdot X+1)+2 \cdot X+N_{CP}$$

where, $c_{init}$ is the initial value of the CSI-RS sequence, $n_s$ is a radio frame slot number of a slot in which the CSI-RS sequence is located, l is an intra-slot number of an orthogonal frequency division multiplexing OFDM symbol in which the CSI-RS sequence is located, X is a non-negative integer, and $N_{CP}$ is 0 or 1; generating a CSI-RS according to the initial value of the CSI-RS sequence; and sending the CSI-RS to the user equipment.

According to a second aspect, a base station is provided and includes: an obtaining module, configured to obtain location information of a user equipment; a first determining module, configured to determine, according to the location information obtained by the obtaining module, that the user equipment is located in a cross coverage area in which at least two nodes provide service, or in a centralized coverage area in which one node provides service; a second determining module, configured to: when the first determining module determines that the user equipment is located in the cross coverage area, determine, according to transmitting capabilities of the at least two nodes and a receiving capability of the user equipment, the number of ports for sending downlink signals to the user equipment; and a sending module, configured to send CSI-RS configuration information to the user equipment, where the CSI-RS configuration information includes the number of ports that is determined by the second determining module.

With reference to the second aspect, in a first possible implementation manner of the second aspect, the second determining module is further configured to: when the first determining module determines that the user equipment is located in the centralized coverage area, determine, according to a transmitting capability of the node that provides service in the centralized coverage area, the number of ports for sending downlink signals to the user equipment.

With reference to the second aspect or the first possible implementation manner of the second aspect, in a second possible implementation manner of the second aspect, the base station further includes: a third determining module, configured to determine a CSI-RS resource configuration sequence number of the user equipment according to a resource that is configured for a coordinated user equipment and is multiplexed into a resource configured for a first non-coordinated user equipment and a second non-coordinated user equipment, where the user equipment belongs to the coordinated user equipment, the first non-coordinated user equipment, or the second non-coordinated user equipment, the coordinated user equipment includes the user equipment located in the cross coverage area in which a first node and a second node provide service, the first non-coordinated user equipment includes the user equipment located in the centralized coverage area in which the first node provides service, and the second non-coordinated user equipment includes the user equipment located in the centralized coverage area in which the second node provides service, where: the sending module is configured to send the CSI-RS configuration information to the user equipment, where the CSI-RS configuration information further includes the CSI-RS resource configuration sequence number of the user equipment that is determined by the third determining module.

With reference to the second possible implementation manner of the second aspect, in a third possible implementation manner of the second aspect, when the user equipment belongs to the first non-coordinated user equipment or the second non-coordinated user equipment, the base station further includes: a mapping module, configured to: when mapping a data signal of the first non-coordinated user equipment, perform a zeroing operation for power of the data signal of the first non-coordinated user equipment on a resource element RE that bears a CSI-RS of the second non-coordinated user equipment, where: the mapping module is further configured to: when mapping a data signal of the second non-coordinated user equipment, perform a zeroing operation for power of the data signal of the second non-coordinated user equipment on an RE that bears a CSI-RS of the first non-coordinated user equipment.

With reference to the second possible implementation manner of the second aspect, in a fourth possible implementation manner of the second aspect, when the second determining module determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table A:

TABLE A

|  | Coordinated UE | First non-coordinated UE | Second non-coordinated UE |
| --- | --- | --- | --- |
| CSI-RS resource configuration sequence number | 0 1 2 3 4 5 6 | 0 1 2 3 4 5 6 | 10 12 14 16 18 11 13 |

TABLE A-continued

| Coordinated UE | First non-coordinated UE | Second non-coordinated UE |
|---|---|---|
| 7 | 7 | 15 |
| 8 | 8 | 17 |
| 9 | 9 | 19 | where, a frame structure used by the base station to send downlink signals to the user equipment adopts a normal cyclic prefix and is a frame structure applicable to type 1 and type 2.

With reference to the second possible implementation manner of the second aspect, in a fifth possible implementation manner of the second aspect, when the second determining module determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table B:

TABLE B

| | Coordinated UE | First non-coordinated UE | Second non-coordinated UE |
|---|---|---|---|
| CSI-RS resource configuration sequence number | 20 | 26 | 20 |
| | 21 | 28 | 21 |
| | 22 | 30 | 22 |
| | 23 | 27 | 23 |
| | 24 | 29 | 24 |
| | 25 | 31 | 25 | where, a frame structure used by the base station to send downlink signals to the user equipment adopts a normal cyclic prefix and is a frame structure applicable only to type 1.

With reference to the second possible implementation manner of the second aspect, in a sixth possible implementation manner of the second aspect, when the second determining module determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table C:

TABLE C

| | Coordinated UE | First non-coordinated UE | Second non-coordinated UE |
|---|---|---|---|
| CSI-RS resource configuration sequence number | 0 | 0 | 8 |
| | 1 | 1 | 9 |
| | 2 | 2 | 12 |
| | 3 | 3 | 13 |
| | 4 | 4 | 10 |
| | 5 | 5 | 11 |

TABLE C-continued

| Coordinated UE | First non-coordinated UE | Second non-coordinated UE |
|---|---|---|
| 6 | 6 | 14 |
| 7 | 7 | 15 | where, a frame structure used by the base station to send downlink signals to the user equipment adopts an extended cyclic prefix and is a frame structure applicable to type 1 and type 2.

With reference to the second possible implementation manner of the second aspect, in a seventh possible implementation manner of the second aspect, when the second determining module determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table D:

TABLE D

| | Coordinated UE | First non-coordinated UE | Second non-coordinated UE |
|---|---|---|---|
| CSI-RS resource configuration sequence number | 20 | 20 | 26 |
| | 21 | 21 | 27 |
| | 22 | 22 | 28 |
| | 23 | 23 | 29 |
| | 24 | 24 | 30 |
| | 25 | 25 | 31 | where, a frame structure used by the base station to send downlink signals to the user equipment adopts an extended cyclic prefix and is a frame structure applicable only to type 1.

With reference to the second possible implementation manner of the second aspect, in an eighth possible implementation manner of the second aspect, when the second determining module determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table E:

TABLE E

| | Coordinated UE | First non-coordinated UE | Second non-coordinated UE |
|---|---|---|---|
| CSI-RS resource configuration sequence number | 0 | 5 | 0 |
| | 1 | 6 | 1 |
| | 2 | 7 | 2 |
| | 3 | 8 | 3 |
| | 4 | 9 | 4 | where, a frame structure for sending downlink signals to the user equipment adopts a normal cyclic prefix and is a frame structure applicable to type 1 and type 2.

With reference to the second possible implementation manner of the second aspect, in a ninth possible implementation manner of the second aspect, when the second determining module determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table F:

TABLE F

|  | Coordinated UE | First non-coordinated UE | Second non-coordinated UE |
|---|---|---|---|
| CSI-RS resource configuration sequence number | 20 | 3 | 0 |
|  | 21 | 4 | 1 |
|  | 22 | 5 | 2 | where, a frame structure used by the base station to send downlink signals to the user equipment adopts a normal cyclic prefix and is a frame structure applicable only to type 1.

With reference to the second possible implementation manner of the second aspect, in a tenth possible implementation manner of the second aspect, when the second determining module determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table G:

TABLE G

|  | Coordinated UE | First non-coordinated UE | Second non-coordinated UE |
|---|---|---|---|
| CSI-RS resource configuration sequence number | 0 | 4 | 0 |
|  | 1 | 5 | 1 |
|  | 2 | 6 | 2 |
|  | 3 | 7 | 3 | where, a frame structure used by the base station to send downlink signals to the user equipment adopts an extended cyclic prefix and is a frame structure applicable to type 1 and type 2.

With reference to the second possible implementation manner of the second aspect, in an eleventh possible implementation manner of the second aspect, when the second determining module determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table H:

TABLE H

|  | Coordinated UE | First non-coordinated UE | Second non-coordinated UE |
|---|---|---|---|
| CSI-RS resource configuration sequence number | 20 | 23 | 20 |
|  | 21 | 24 | 21 |
|  | 22 | 25 | 22 | where, a frame structure used by the base station to send downlink signals to the user equipment adopts an extended cyclic prefix and is a frame structure applicable only to type 1.

With reference to the second aspect or any one of the possible implementation manners from the first to the eleventh possible implementation manners of the second aspect, in a twelfth possible implementation manner of the second aspect, the base station further includes: a fourth determining module, configured to determine an initial value of a CSI-RS sequence, where the initial value of the CSI-RS sequence is determined according to the following equation:

$$c_{init}=2^{10}\cdot(7\cdot(n_s+1)+l+1)\cdot(2\cdot X+1)+2\cdot X+N_{CP}$$

where, $c_{init}$ is the initial value of the CSI-RS sequence, $n_s$ is a radio frame slot number of a slot in which the CSI-RS sequence is located, l is an intra-slot number of an orthogonal frequency division multiplexing OFDM symbol in which the CSI-RS sequence is located, X is a non-negative integer, and $N_{CP}$ is 0 or 1; and a generating module, configured to generate a CSI-RS according to the initial value of the CSI-RS sequence that is determined by the fourth determining module, where: the sending module is further configured to send the CSI-RS generated by the generating module to the user equipment.

Based on the foregoing technical solutions, in the method for configuring a channel state information reference signal, and the base station according to the embodiments of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

BRIEF DESCRIPTION OF DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and a person of ordinary skill in the art may still derive other drawings according to these accompanying drawings without creative efforts.

FIG. 3 is another schematic flowchart of a method for configuring a CSI-RS according to an embodiment of the present invention;

FIG. 4 is a schematic diagram of an RE mapping effect according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the embodiments to be described are a part rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention are applicable to various communications systems, for example, a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA) system, general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunication System, UMTS), and a Worldwide Interoperability for Microwave Access (Worldwide Interoperability for Microwave Access, WiMAX) communications system.

In the embodiments of the present invention, a terminal equipment (Terminal Equipment) may be called a terminal (Terminal), a user equipment (User Equipment, UE), a mobile station (Mobile Station, MS), a mobile terminal (Mobile Terminal), or the like; and the terminal equipment may communicate with one or more core networks over a radio access network (Radio Access Network, RAN). For example, the terminal equipment may be a mobile phone (or called a "cellular" phone), or a computer with a mobile terminal, and the terminal equipment may also be a mobile apparatus that is portable, pocket-sized, handheld, built in a computer, or mounted on a vehicle. They exchange voice and/or data with the radio access network.

It should be further understood that, in the embodiments of the present invention, a base station may be a base station (Base Transceiver Station, BTS) in GSM or CDMA, or may be a base station (NodeB, NB) in WCDMA, or may also be an evolved base station (Evolutional NodeB, eNB) in LTE, which is not limited in the present invention. However, for ease of description, the following embodiments use an eNB as an example for description.

Figure 1:
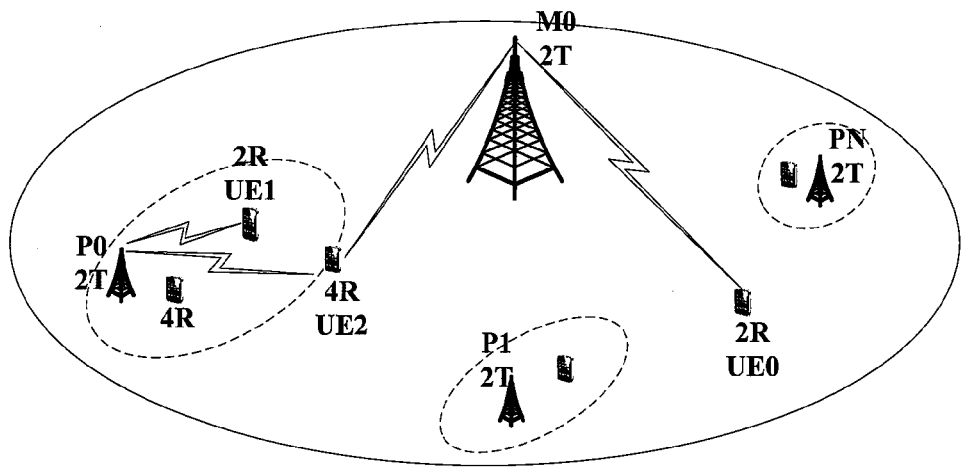
FIG. 1 is a schematic diagram of an application scenario of a method for configuring a CSI-RS according to an embodiment of the present invention.

FIG. 1 shows an application scenario of a method for configuring a CSI-RS according to an embodiment of the present invention. In a communications system shown in FIG. 1, the communications system may include a macro site and multiple distributed small-cell base stations, or include multiple remote antenna units, or include multiple virtual sectors, and so on, where the macro site perform ins centralized control and joint scheduling for all distributed small-cell base stations, antenna units, or virtual sectors in the area.

For example, as shown in FIG. 1, the communications system includes multiple nodes P0, P1, . . . , PN. Such nodes are located under a same base station M0, and it is assumed that all the nodes use a same physical cell identifier (ID) and each of them uses two antennas for transmitting. A UE0 is located in a centralized coverage area in which the base station M0 provides service; a UE1 is located in a centralized coverage area in which the node P0 provides service; and a UE2 is located in a cross coverage area in which the base station M0 and the node P0 jointly provide service. For the UE2 located in the cross coverage area, the communications system may switch to a coordinated transmission mode of the base station and the node, so as to enhance signals and eliminate co-channel interference.

It should be understood that, the method for configuring a CSI-RS according to the embodiment of the present invention is described by using the application scenario shown in FIG. 1 as an example, but the present invention is not limited thereto. The method may also be applied to other systems that have a cross coverage area and a centralized coverage area.

Figure 2:
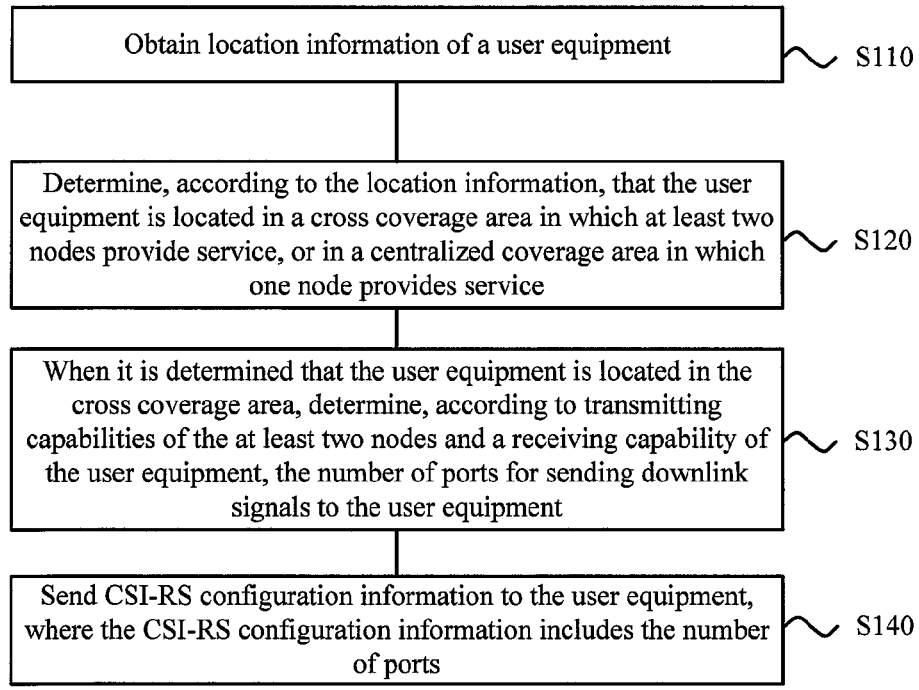
FIG. 2 is a schematic flowchart of a method for configuring a CSI-RS according to an embodiment of the present invention.

FIG. 2 is a schematic flowchart of a method 100 for configuring a CSI-RS according to an embodiment of the present invention. The method 100 may be executed by a network device, where the network device is an entity used to implement a CSI-RS configuration function, such as a base station or a macro site. The embodiment of the present invention does not limit a specific form of the network device.

As shown in FIG. 2, the method 100 includes:

S110: Obtain location information of a user equipment.

S120: Determine, according to the location information, that the user equipment is located in a cross coverage area in which at least two nodes provide service, or in a centralized coverage area in which one node provides service.

S130: When it is determined that the user equipment is located in the cross coverage area, determine, according to transmitting capabilities of the at least two nodes and a receiving capability of the user equipment, the number of ports for sending downlink signals to the user equipment.

S140: Send CSI-RS configuration information to the user equipment, where the CSI-RS configuration information includes the number of ports.

Specifically, the network device may locate the user equipment to obtain the location information of the user equipment. In this way, the network device can determine whether the user equipment is located in the cross coverage area or located in the centralized coverage area. When it is determined that the user equipment is located in the cross coverage area, the network device may determine, according to the transmitting capabilities of the at least two nodes that provide the cross coverage area and the receiving capability of the user equipment, the number of ports for sending downlink signals to the user equipment, that is, determine the number of transmitting antennas of the network device; and send the CSI-RS configuration information that includes the number of ports to the user equipment.

Therefore, in the method for configuring a channel state information reference signal according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

In addition, the method for configuring a channel state information reference signal according to the embodiment of the present invention enables a system to obtain joint downlink channel information of multi-point coordinated nodes, such as PMI and CQI information, so as to implement coexistence of 2T/4T/8T transmission, and 8-rank signal transmission according to signal coverage conditions of the user equipment and a maximum processing capability of the user equipment. Further, the method can convert an area with serious interference between cells (virtual sectors or physical sectors) into an area in which coordinated multi-stream transmission can be performed and channel conditions are good.

It should be understood that, in the embodiment of the present invention, after receiving the CSI-RS configuration information that includes the number of ports, the user equipment may determine a corresponding pilot location according to the CSI-RS configuration information, and may perform corresponding downlink channel measurement. In this way, the user equipment can feed back information, such as the PMI and CQI, obtained by means of measurement to the network device. The network device may select, according to measurement information fed back by the user equipment, a corresponding precoding matrix and send a weight to the user equipment, so that the user equipment can demodulate data according to the weight.

In the embodiment of the present invention, the network device may determine whether the user equipment is located in a coverage area of a node according to a magnitude relationship between uplink received power or a path loss of the node and a threshold. For example, the network device may receive an uplink sounding reference signal (Sounding Reference Signal, SRS) of the user equipment, and determine the uplink received power or the path loss. For example, if uplink received power of data or a signal received by the node from the user equipment is greater than a first threshold, it may be determined that the user equipment is located in the coverage area of the node; otherwise, the user equipment is located outside the coverage area of the node. For example, if a path loss of data or a signal received by the node from the user equipment is less than a second threshold, it may be determined that the user equipment is located in the coverage area of the node; otherwise, the user equipment is located outside the coverage area of the node. In this way, it can be determined whether the user equipment is located in a cross coverage area in which at least two nodes provide service, or in a centralized coverage area in which one node provides service.

It should be understood that, in the embodiment of the present invention, the network device may also determine, according to a magnitude relationship between received power or a path loss of a signal received by the user equipment from the node and a threshold, whether the user equipment is located in the coverage area of the node, but the embodiment of the present invention is not limited thereto.

It should be further understood that, in the embodiment of the present invention, a cross coverage area refers to an area in which at least two nodes provide service for a user equipment, that is, in a cross coverage area, at least two nodes provide communication service for the user equipment, and therefore the cross coverage area may also be called a multi-node coverage area; and a centralized coverage area refers to an area in which one node provides service for a user equipment, that is, in a centralized coverage area, only one node provides communication service for the user equipment, and therefore the centralized coverage area may also be called a single-node coverage area.

In the embodiment of the present invention, optionally, the determining the number of ports for sending downlink signals to the user equipment includes: when it is determined that the user equipment is located in the centralized coverage area, determining, according to a transmitting capability of the node that provides service in the centralized coverage area, the number of ports for sending downlink signals to the user equipment.

Specifically, in the embodiment of the present invention, the network device may determine, according to the location information of the user equipment, whether the user equipment is located in the cross coverage area or the centralized coverage area; and when the user equipment is located in the cross coverage area, the network device determines, according to transmitting capabilities of the nodes that provide the cross coverage area and a receiving capability of the user equipment, the number of ports used by the network device to send downlink signals to the user equipment. For example, the network device configures 4-port (Port) transmitting ports and a 4-port CSI-RS configuration for the user equipment, which means that the system has a maximum transmission capability of 4 streams and provides larger gain space than that of non-coordinated 2T transmission. If the user equipment is located in the centralized coverage area, the network device determines, according to a transmitting capability of one node that provides the centralized coverage area, the number of ports used by the network device to send downlink signals to the user equipment. For example, for a user located in the centralized coverage area, the system configures 2-port transmitting ports and a 2-port CSI-RS configuration for the user.

It should be understood that, in the embodiment of the present invention, a transmitting capability of a node includes the maximum number of transmitting antennas or the maximum number of ranks that can be supported by the node; and a receiving capability of a user equipment includes the maximum number of receiving antennas or the maximum number of ranks that can be supported by the user equipment, but the embodiment of the present invention is not limited thereto.

In the user-level CSI-RS configuration method according to the embodiment of the present invention, a CSI-RS resource configured for a coordinated transmission user equipment can be completely multiplexed into a CSI-RS resource configured for a non-coordinated transmission user equipment. In this way, CSI-RS overhead of the entire system can be controlled, a significant increase in the CSI-RS overhead is avoided, and resource utilization is improved.

Specifically, in the embodiment of the present invention, optionally, as shown in FIG. 3, the method 100 further includes:

S150: Determine a CSI-RS resource configuration sequence number of the user equipment according to a resource that is configured for a coordinated user equipment and is multiplexed into a resource configured for a first non-coordinated user equipment and a second non-coordinated user equipment, where the user equipment belongs to the coordinated user equipment, the first non-coordinated user equipment, or the second non-coordinated user equipment, the coordinated user equipment includes the user equipment located in the cross coverage area in which a first node and a second node provide service, the first non-coordinated user equipment includes the user equipment located in the centralized coverage area in which the first node provides service, and the second non-coordinated user equipment includes the user equipment located in the centralized coverage area in which the second node provides service.

The sending CSI-RS configuration information to the user equipment includes:

S141: Send the CSI-RS configuration information to the user equipment, where the CSI-RS configuration information includes the CSI-RS resource configuration sequence number of the user equipment.

Description is given below by using the application scenario shown in FIG. 1 as an example. For the UE0 and the UE1 located in the centralized coverage area, both the antenna node M0 that provides communication service for the UE0 and the antenna node P0 that provides communication service for the UE1 use 2 ports for transmitting, and the UE0 and the UE1 use 2 ports for receiving. For the UE2 located in the cross coverage area, each of the two corresponding antenna nodes M0 and P0 that provide the cross coverage area uses 2 ports for transmitting, and the UE2 uses 4 ports for receiving and transmitting.

To perform corresponding channel measurement, the network device needs to specify a corresponding CSI-RS resource configuration scheme for each UE. We hereby put forward a CSI-RS resource configuration scheme that can meet the foregoing multi-port transmitting function requirement and save resource elements (Resource Element, RE). Specific implementation may be that a resource configured for a coordinated user equipment is multiplexed into a resource configured for a first non-coordinated user equipment and a second non-coordinated user equipment. For example, by using the resource configuration scheme, the UE0 can map two ports numbered 15 and 16 to 2 pilot REs, the UE1 can map two ports numbered 15 and 16 to other 2 pilot REs, and the UE2 that uses 4 ports can map four ports numbered 15, 16, 17, and 18 to 4 pilot REs that are multiplexed with the UE0 and the UE1, as shown in FIG. 4, thereby implementing RE resource multiplexing.

Therefore, in the method for configuring a channel state information reference signal according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

In addition, in the method for configuring a channel state information reference signal according to the embodiment of the present invention, a resource configured for a coordinated user equipment is multiplexed into a resource configured for a non-coordinated user equipment. In this way, CSI-RS pilot overhead of the system can be saved, resource utilization of the system can be improved, and user experience can be further enhanced.

In the embodiment of the present invention, because the CSI-RS is a cell-level pilot, a pilot RE location that is not used by the UE according to a configuration scheme may be treated as an ordinary shared RE. However, to avoid overwriting CSI-RS information of other users in the RE location, no data signal should be placed in the RE location. One solution is that, in a case where the eNB treats the RE location as an ordinary shared RE, the eNB performs power zeroing for the data signal in the RE location before framing. In receiving and demodulation, the UE treats the pilot signal in the RE location as ordinary data for decoding, and bit errors may occur. However, because the CSI-RS is sparse, an impact on a bit error rate is small, and correct data can be obtained by using an error correction decoding function.

Figure 5:
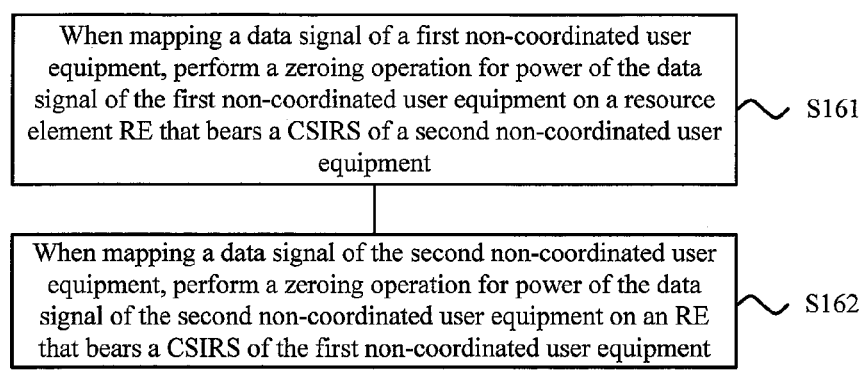
FIG. 5 is still another schematic flowchart of a method for configuring a CSI-RS according to an embodiment of the present invention.

Therefore, in the embodiment of the present invention, as shown in FIG. 5, optionally, when the user equipment belongs to the first non-coordinated user equipment or the second non-coordinated user equipment, the method 100 further includes:

S161: When mapping a data signal of the first non-coordinated user equipment, perform a zeroing operation for power of the data signal of the first non-coordinated user equipment on a resource element RE that bears a CSI-RS of the second non-coordinated user equipment.

S162: When mapping a data signal of the second non-coordinated user equipment, perform a zeroing operation for power of the data signal of the second non-coordinated user equipment on an RE that bears a CSI-RS of the first non-coordinated user equipment.

In the embodiment of the present invention, by setting a proper CSI-RS resource for the coordinated user equipment, the first non-coordinated user equipment, and the second non-coordinated user equipment, the CSI-RS resource of the coordinated user equipment is multiplexed into the CSI-RS resource of the first non-coordinated user equipment and the second non-coordinated user equipment. The following specifically describes correspondence between a CSI-RS resource configuration sequence number of the coordinated user equipment and CSI-RS resource configuration sequence numbers of the first non-coordinated user equipment and the second non-coordinated user equipment with reference to information such as a frame structure used by the base station to send downlink signals to the user equipment and the number of ports.

In the embodiment of the present invention, optionally, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table A:

TABLE A

|  | Coordinated UE | First non-coordinated UE | Second non-coordinated UE |
|---|---|---|---|
| CSI-RS resource configuration sequence number | 0 | 0 | 10 |
|  | 1 | 1 | 12 |
|  | 2 | 2 | 14 |
|  | 3 | 3 | 16 |
|  | 4 | 4 | 18 |
|  | 5 | 5 | 11 |
|  | 6 | 6 | 13 |
|  | 7 | 7 | 15 |
|  | 8 | 8 | 17 |
|  | 9 | 9 | 19 | where, a frame structure for sending downlink signals to the user equipment adopts a normal (normal) cyclic prefix (Cyclic Prefix, CP) and is a frame structure applicable to type 1 (type1) and type 2 (type2).

Description is given below still by using the application scenario shown in FIG. 1 as an example. Table A describes a frame structure that adopts a normal CP and is applicable to type 1 and type 2. Using a configuration in a first row as an example, the CSI-RS resource configuration sequence number used by the UE0 is 0 (CSI-RS config 0), the CSI-RS resource configuration sequence number used by the UE1 is 10 (CSI-RS config 10), and the CSI-RS resource configuration sequence number used by the UE2 is 0 (CSI-RS config 0). According to a CSI-RS sequence calculation formula, a location (k, l) mapped from the CSI-RS of each UE onto the RE can be obtained. As shown in the following Table 1, $n_s$ indicates a radio frame slot number of a slot (slot) in which the pilot is located, and the ports numbered 15 and 16 and the ports numbered 17 and 18 adopt code division multiplexing.

TABLE 1

| User equipment | Port number Location (k, l) | | $n_s$ mod 2 |
|---|---|---|---|
|  | 15, 16 | 17, 18 |  |
| UE 0 | (9, 5), (9, 6) |  | 0 |
| UE 1 | (3, 5), (3, 6) |  | 0 |
| UE 2 | (9, 5), (9, 6) | (3, 5), (3, 6) | 0 |

Figure 6:
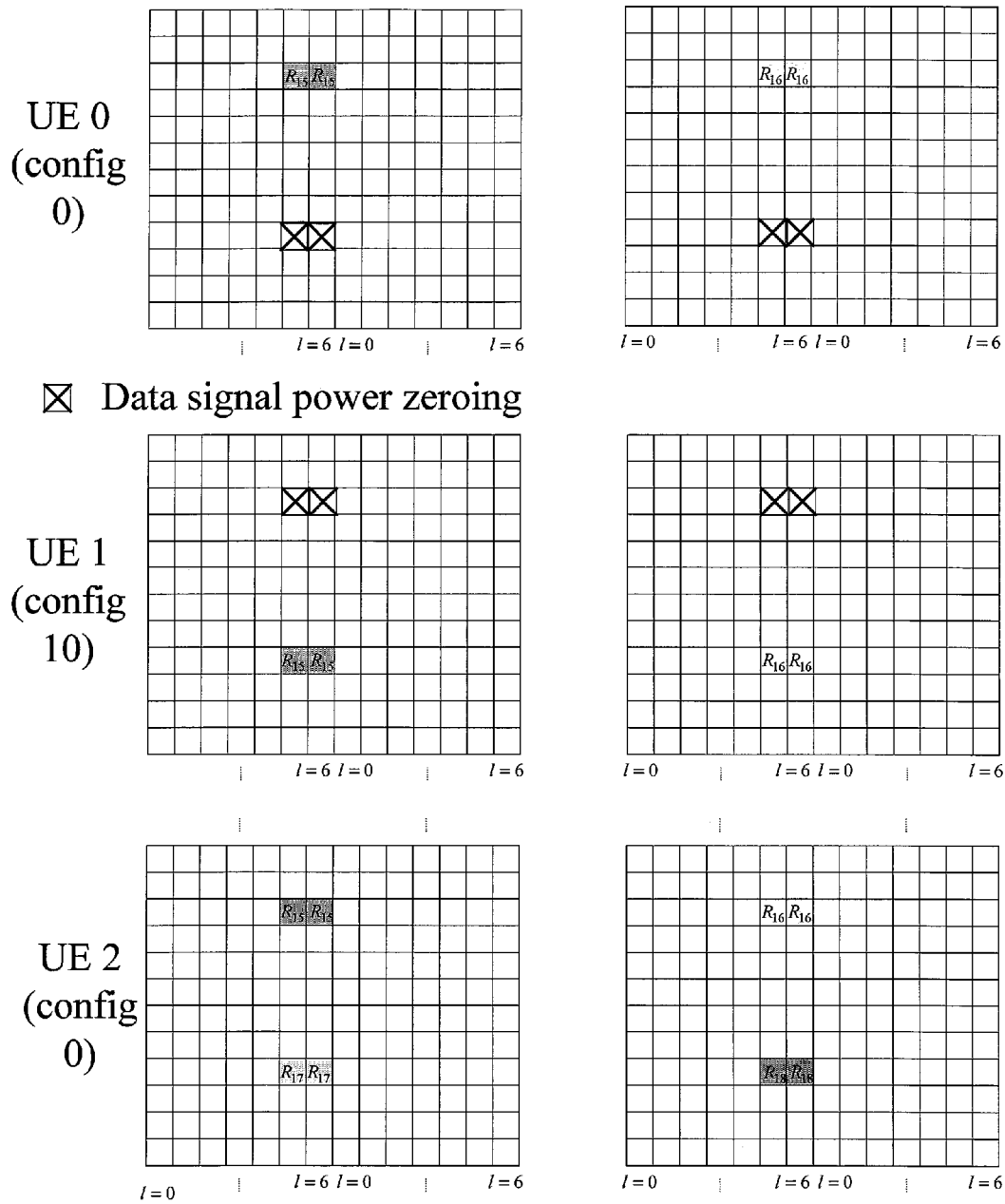
FIG. 6 is a schematic diagram of a CSI-RS mapping diagram according to an embodiment of the present invention.

A CSI-RS mapping diagram shown in FIG. 6 can be obtained according to Table 1, where the CSI-RS resource is completely multiplexed, without increasing extra system overhead.

In the embodiment of the present invention, optionally, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table B:

TABLE B

|  | Coordinated UE | First non-coordinated UE | Second non-coordinated UE |
|---|---|---|---|
| CSI-RS resource configuration sequence number | 20 | 26 | 20 |
|  | 21 | 28 | 21 |
|  | 22 | 30 | 22 |
|  | 23 | 27 | 23 |
|  | 24 | 29 | 24 |
|  | 25 | 31 | 25 | where, a frame structure for sending downlink signals to the user equipment adopts a normal cyclic prefix and is a frame structure applicable only to type 1.

In the embodiment of the present invention, optionally, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table C:

TABLE C

|  | Coordinated UE | First non-coordinated UE | Second non-coordinated UE |
|---|---|---|---|
| CSI-RS resource configuration sequence number | 0 | 0 | 8 |
|  | 1 | 1 | 9 |
|  | 2 | 2 | 12 |
|  | 3 | 3 | 13 |
|  | 4 | 4 | 10 |
|  | 5 | 5 | 11 |
|  | 6 | 6 | 14 |
|  | 7 | 7 | 15 | where, a frame structure for sending downlink signals to the user equipment adopts an extended cyclic prefix (Extended CP) and is a frame structure applicable to type 1 and type 2.

In the embodiment of the present invention, optionally, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table D:

TABLE D

|  | Coordinated UE | First non-coordinated UE | Second non-coordinated UE |
|---|---|---|---|
| CSI-RS resource configuration sequence number | 20 | 20 | 26 |
|  | 21 | 21 | 27 |
|  | 22 | 22 | 28 |
|  | 23 | 23 | 29 |
|  | 24 | 24 | 30 |
|  | 25 | 25 | 31 | where, a frame structure for sending downlink signals to the user equipment adopts an extended cyclic prefix and is a frame structure applicable only to type 1.

Therefore, in the method for configuring a channel state information reference signal according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

Figure 7:
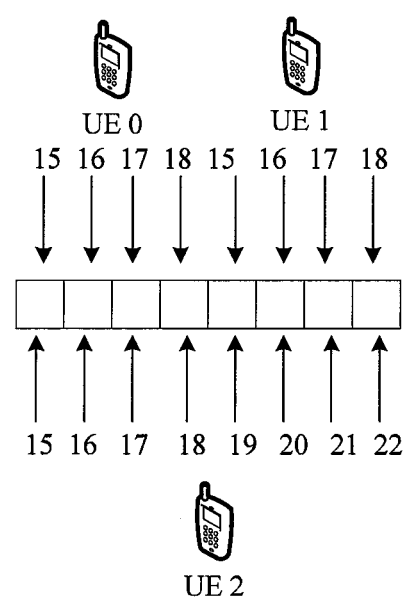
FIG. 7 is another schematic diagram of an RE mapping effect according to an embodiment of the present invention.

In the embodiment of the present invention, for a network in which a single node performs 4T transmission, user-level 4/8-port (Port) coordinated self-organizing MIMO transmission can be implemented, a basic process of which is similar to the foregoing embodiment. In addition, for 4/8-port self-organizing transmission, a similar CSI-RS configuration scheme that can save RE resources may also be put forward. For example, as shown in FIG. 7, for example, by using the resource configuration scheme, the UE0 can map four ports numbered 15, 16, 17 and 18 to 4 pilot REs, the UE1 can map four ports numbered 15, 16, 17 and 18 to other 4 pilot REs, and the UE2 that uses 8 ports can map eight ports numbered 15-22 to 8 pilot REs that are multiplexed with the UE0 and the UE1, thereby implementing RE resource multiplexing.

Specifically, in the embodiment of the present invention, optionally, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table E:

TABLE E

|  | Coordinated UE | First non-coordinated UE | Second non-coordinated UE |
|---|---|---|---|
| CSI-RS resource configuration sequence number | 0 | 5 | 0 |
|  | 1 | 6 | 1 |
|  | 2 | 7 | 2 |
|  | 3 | 8 | 3 |
|  | 4 | 9 | 4 | where, a frame structure for sending downlink signals to the user equipment adopts a normal cyclic prefix and is a frame structure applicable to type 1 and type 2.

Description is given below still by using the application scenario shown in FIG. 1 as an example. Table E describes a frame structure that adopts a normal CP and is applicable to type 1 and type 2. Using a configuration in a first row as an example, the CSI-RS resource configuration sequence number used by the UE0 with a 4-port receiving capability is 0 (CSI-RS config 0), the CSI-RS resource configuration sequence number used by the UE1 with a 4-port receiving capability is 5 (CSI-RS config 5), and the CSI-RS resource configuration sequence number used by the UE2 with an 8-port receiving capability is 0 (CSI-RS config 0). According to a CSI-RS sequence calculation formula, a location (k, 1) mapped from the CSI-RS of each UE onto the RE is obtained. As shown in the following Table 2, $n_s$ indicates a radio frame slot number of a slot (slot) in which the pilot is located, and the ports numbered 15 and 16, the ports numbered 17 and 18, the ports numbered 19 and 20, and the ports numbered 21 and 22 adopt code division multiplexing.

TABLE 2

| User equipment | Port number Location (k, l) | | | | $n_s$ mod 2 |
|---|---|---|---|---|---|
|  | 15, 16 | 17, 18 | 19, 20 | 21, 22 |  |
| UE 0 | (9, 5), (9, 6) | (3, 5), (3, 6) |  |  | 0 |
| UE 1 | (8, 5), (8, 6) | (2, 5), (2, 6) |  |  | 0 |
| UE 2 | (9, 5), (9, 6) | (3, 5), (3, 6) | (8, 5), (8, 6) | (2, 5), (2, 6) | 0 |

Figure 8:
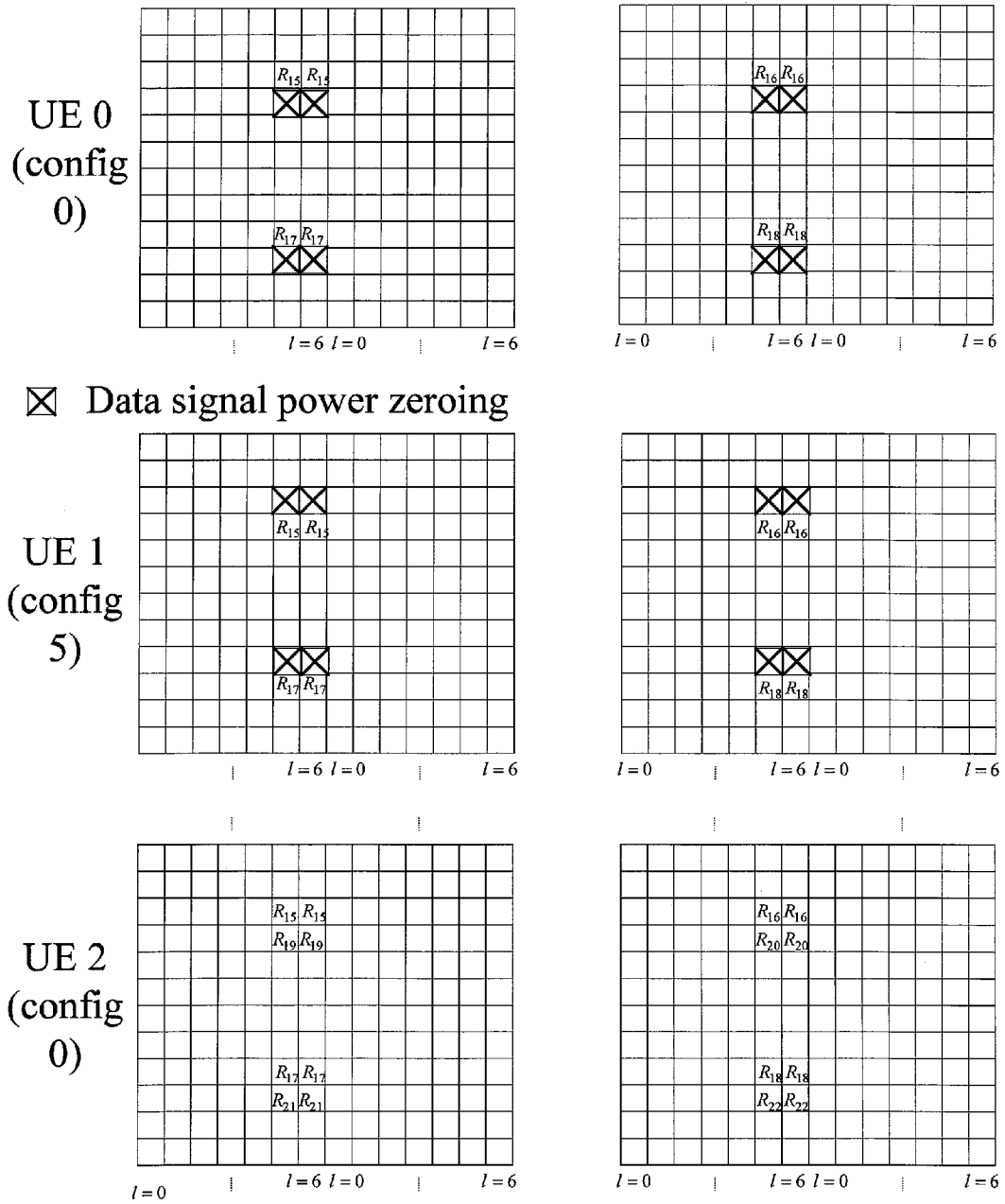
FIG. 8 is another schematic diagram of a CSI-RS mapping diagram according to an embodiment of the present invention.

A CSI-RS mapping diagram shown in FIG. 8 can be obtained according to Table 2, where the CSI-RS resource is completely multiplexed, without increasing extra system overhead.

In the embodiment of the present invention, optionally, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table F:

TABLE F

|  | Coordinated UE | First non-coordinated UE | Second non-coordinated UE |
|---|---|---|---|
| CSI-RS resource configuration sequence number | 20 | 3 | 0 |
|  | 21 | 4 | 1 |
|  | 22 | 5 | 2 | where, a frame structure for sending downlink signals to the user equipment adopts a normal cyclic prefix and is a frame structure applicable only to type 1.

In the embodiment of the present invention, optionally, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table G:

TABLE G

|  | Coordinated UE | First non-coordinated UE | Second non-coordinated UE |
|---|---|---|---|
| CSI-RS resource configuration sequence number | 0 | 4 | 0 |
|  | 1 | 5 | 1 |
|  | 2 | 6 | 2 |
|  | 3 | 7 | 3 | where, a frame structure for sending downlink signals to the user equipment adopts an extended cyclic prefix and is a frame structure applicable to type 1 and type 2.

In the embodiment of the present invention, optionally, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table H:

TABLE H

|  | Coordinated UE | First non-coordinated UE | Second non-coordinated UE |
| --- | --- | --- | --- |
| CSI-RS resource configuration sequence number | 20 21 22 | 23 24 25 | 20 21 22 | where, a frame structure for sending downlink signals to the user equipment adopts an extended cyclic prefix and is a frame structure applicable only to type 1.

Therefore, in the method for configuring a channel state information reference signal according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

Figure 9:
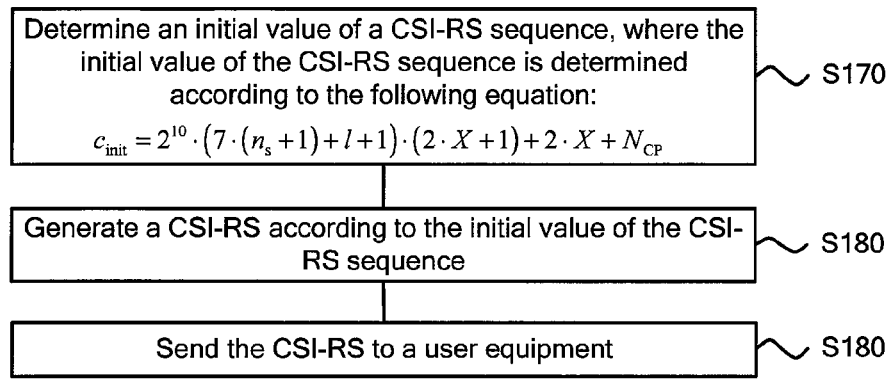
FIG. 9 is still another schematic flowchart of a method for configuring a CSI-RS according to an embodiment of the present invention.

In the embodiment of the present invention, optionally, as shown in FIG. 9, the method 100 further includes:

S170: Determine an initial value of a CSI-RS sequence, where the initial value of the CSI-RS sequence is determined according to the following equation:

$$c_{init}=2^{10} \cdot (7 \cdot (n_s+1)+l+1) \cdot (2 \cdot X+1)+2 \cdot X+N_{CP}$$

where, $c_{init}$ is the initial value of the CSI-RS sequence, $n_s$ is a radio frame slot number of a slot in which the CSI-RS sequence is located, l is an intra-slot number of an orthogonal frequency division multiplexing OFDM symbol in which the CSI-RS sequence is located, X is a non-negative integer, and $N_{CP}$ is 0 or 1.

S180: Generate a CSI-RS according to the initial value of the CSI-RS sequence.

S190: Send the CSI-RS to the user equipment.

Specifically, in this embodiment, the initial value of the CSI-RS sequence is independent of the cell ID, and primarily depends on the non-negative integer X, where a value range of X may be 0-503. In this way, the method according to the embodiment of the present invention is applicable to application scenarios such as a distributed small-cell base station with different physical cell IDs, a remote antenna unit, or multiple virtual sectors.

It should be understood that, in the embodiment of the present invention, in a process in which the UE moves from a centralized coverage area of one antenna node to a cross coverage area of two antenna nodes, after the UE is identified and located to determine that the UE is located in the centralized coverage area or the cross coverage area, 2-port transmission may be performed for the UE in the centralized coverage area by using a single node, and two nodes perform coordinated transmission in the cross coverage area, thereby implementing switching of 2-port and 4-port coordinated self-organizing transmission. Referring to Table A to Table D, the CSI-RS configuration scheme of the UE may be changed accordingly to implement switching from a 2-port working state to a 4-port working state at the UE end. Still using the configuration in the first row in Table A as an example, when the UE1 is located in the centralized coverage area on the left side, a 2-port working configuration scheme CSI-RS config 0 may be specified; when detecting that the UE1 moves rightward to the cross coverage area, the eNB may specify a 4-port working configuration scheme CSI-RS config 10 for the UE1; and then, when detecting that the UE1 moves rightward to the centralized coverage area, the eNB may specify a 2-port working configuration scheme CSI-RS config 0 for the UE1.

It should be further understood that, in various embodiments of the present invention, sequence numbers of the foregoing processes do not mean an order of implementation. The implementation order of each process should depend on its functions and inherent logics, and shall not constitute any limitation to the implementation process of the embodiments of the present invention.

The method for configuring a channel state information reference signal in the embodiments of the present invention has overcome technical defects in the prior art, for example, a CoMP or HetNet and other similar distributed DAS systems are not compatible with UEs of earlier versions in a multi-point coordinated transmission process, and a multi-stream coordinated transmission technology is not mature. The method of the present invention provides the following advantages:

1. The method according to the embodiments of the present invention enables obtaining of joint downlink channel information (such as a PMI and a CQI) of multi-point coordinated nodes, so as to implement coexistence of 1T/2T/3T/4T/8T transmission and signal transmission of up to 8 ranks according to signal coverage conditions of a user and a maximum processing capability of the user. For example, 1 T/2T transmission may be applied to a 2R terminal in the system, and 1T/2T/3T/4T transmission may be applied to a 4R terminal.

2. The method according to the embodiments of the present invention can convert an area with serious interference between cells (virtual sectors or physical sectors) into an area in which coordinated multi-stream transmission can be performed and channel conditions are good.

3. The method according to the embodiments of the present invention can sufficiently ensure that CSI-RS overhead is controlled within a reasonable range, without significantly increasing system overhead.

4. The method according to the embodiments of the present invention enables multi-point coordinated transmission of a remote antenna to obtain, theoretically, a low channel dependency, and is more favorable to reflection of a MIMO space multiplexing gain.

5. A traditional macro site uses 4T or 8T transmission, and, relative to 2T, open-loop MIMO has no gain, and closed-loop gain depends on high-precision transmitting channel calibration; but in the method according to the embodiments of the present invention, a distributed remote coordinated transmitting antenna forms an MIMO channel that is almost completely independent, which is more favorable to space multiplexing and is not sensitive to the PMI feed back, and basically no requirement is imposed on channel calibration precision.

6. The method according to the embodiments of the present invention can properly implement single-stream/multi-stream coordinated transmission and PMI/CQI feedback of a UE, and the UE can also support an R10 system transparently.

Therefore, in the method for configuring a channel state information reference signal according to the embodiments of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

The foregoing describes in detail the method for configuring a CSI-RS according to the embodiments of the present invention with reference to FIG. 1 to FIG. 9, and the following describes in detail a base station for configuring a CSI-RS according to the embodiments of the present invention with reference to FIG. 10 to FIG. 13.

Figure 10:
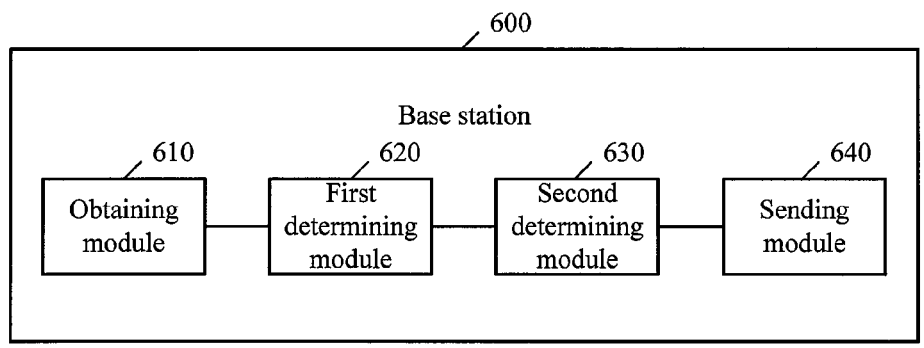
FIG. 10 is a schematic block diagram of a base station according to an embodiment of the present invention.

FIG. 10 is a schematic block diagram of a base station 600 according to an embodiment of the present invention. As shown in FIG. 10, the base station 600 includes:

an obtaining module 610, configured to obtain location information of a user equipment;

a first determining module 620, configured to determine, according to the location information obtained by the obtaining module 610, that the user equipment is located in a cross coverage area in which at least two nodes provide service, or in a centralized coverage area in which one node provides service;

a second determining module 630, configured to: when the first determining module 620 determines that the user equipment is located in the cross coverage area, determine, according to transmitting capabilities of the at least two nodes and a receiving capability of the user equipment, the number of ports for sending downlink signals to the user equipment; and a sending module 640, configured to send CSI-RS configuration information to the user equipment, where the CSI-RS configuration information includes the number of ports that is determined by the second determining module 630.

Therefore, in the base station according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

In the embodiment of the present invention, optionally, the second determining module 630 is further configured to: when the first determining module determines that the user equipment is located in the centralized coverage area, determine, according to a transmitting capability of the node that provides service in the centralized coverage area, the number of ports for sending downlink signals to the user equipment.

Figure 11:
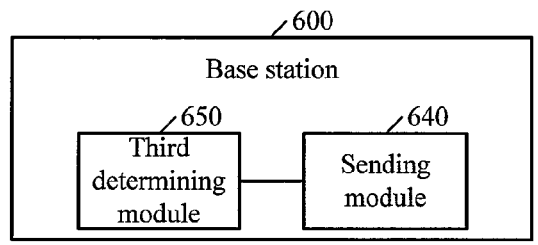
FIG. 11 is another schematic block diagram of a base station according to an embodiment of the present invention.

In the embodiment of the present invention, optionally, as shown in FIG. 11, the base station 600 further includes:

a third determining module 650, configured to determine a CSI-RS resource configuration sequence number of the user equipment according to a resource that is configured for a coordinated user equipment and is multiplexed into a resource configured for a first non-coordinated user equipment and a second non-coordinated user equipment, where the user equipment belongs to the coordinated user equipment, the first non-coordinated user equipment, or the second non-coordinated user equipment, the coordinated user equipment includes the user equipment located in the cross coverage area in which a first node and a second node provide service, the first non-coordinated user equipment includes the user equipment located in the centralized coverage area in which the first node provides service, and the second non-coordinated user equipment includes the user equipment located in the centralized coverage area in which the second node provides service.

The sending module 640 is configured to send the CSI-RS configuration information to the user equipment, where the CSI-RS configuration information further includes the CSI-RS resource configuration sequence number of the user equipment that is determined by the third determining module 650.

In the embodiment of the present invention, optionally, when the user equipment belongs to the first non-coordinated user equipment or the second non-coordinated user equipment, the base station 600 further includes:

a mapping module, configured to: when mapping a data signal of the first non-coordinated user equipment, perform a zeroing operation for power of the data signal of the first non-coordinated user equipment on a resource element RE that bears a CSI-RS of the second non-coordinated user equipment.

The mapping module is further configured to: when mapping a data signal of the second non-coordinated user equipment, perform a zeroing operation for power of the data signal of the second non-coordinated user equipment on an RE that bears a CSI-RS of the first non-coordinated user equipment.

In the embodiment of the present invention, optionally, when the second determining module 630 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table A:

TABLE A

|  | Coordinated UE | First non-coordinated UE | Second non-coordinated UE |
| --- | --- | --- | --- |
| CSI-RS resource configuration sequence number | 0 | 0 | 10 |
|  | 1 | 1 | 12 |
|  | 2 | 2 | 14 |
|  | 3 | 3 | 16 |
|  | 4 | 4 | 18 |
|  | 5 | 5 | 11 |
|  | 6 | 6 | 13 |
|  | 7 | 7 | 15 |
|  | 8 | 8 | 17 |
|  | 9 | 9 | 19 | where, a frame structure used by the base station to send downlink signals to the user equipment adopts a normal cyclic prefix and is a frame structure applicable to type 1 and type 2.

In the embodiment of the present invention, optionally, when the second determining module 630 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table B:

TABLE B

|  | Coordinated UE | First non-coordinated UE | Second non-coordinated UE |
|---|---|---|---|
| CSI-RS resource configuration sequence number | 20 | 26 | 20 |
|  | 21 | 28 | 21 |
|  | 22 | 30 | 22 |
|  | 23 | 27 | 23 |
|  | 24 | 29 | 24 |
|  | 25 | 31 | 25 | where, a frame structure used by the base station to send downlink signals to the user equipment adopts a normal cyclic prefix and is a frame structure applicable only to type 1.

In the embodiment of the present invention, optionally, when the second determining module 630 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table C:

TABLE C

|  | Coordinated UE | First non-coordinated UE | Second non-coordinated UE |
|---|---|---|---|
| CSI-RS resource configuration sequence number | 0 | 0 | 8 |
|  | 1 | 1 | 9 |
|  | 2 | 2 | 12 |
|  | 3 | 3 | 13 |
|  | 4 | 4 | 10 |
|  | 5 | 5 | 11 |
|  | 6 | 6 | 14 |
|  | 7 | 7 | 15 | where, a frame structure used by the base station to send downlink signals to the user equipment adopts an extended cyclic prefix and is a frame structure applicable to type 1 and type 2.

In the embodiment of the present invention, optionally, when the second determining module 630 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table D:

TABLE D

|  | Coordinated UE | First non-coordinated UE | Second non-coordinated UE |
|---|---|---|---|
| CSI-RS resource configuration sequence number | 20 | 20 | 26 |
|  | 21 | 21 | 27 |
|  | 22 | 22 | 28 |
|  | 23 | 23 | 29 |
|  | 24 | 24 | 30 |
|  | 25 | 25 | 31 | where, a frame structure used by the base station to send downlink signals to the user equipment adopts an extended cyclic prefix and is a frame structure applicable only to type 1.

In the embodiment of the present invention, optionally, when the second determining module 630 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table E:

TABLE E

|  | Coordinated UE | First non-coordinated UE | Second non-coordinated UE |
|---|---|---|---|
| CSI-RS resource configuration sequence number | 0 | 5 | 0 |
|  | 1 | 6 | 1 |
|  | 2 | 7 | 2 |
|  | 3 | 8 | 3 |
|  | 4 | 9 | 4 | where, a frame structure for sending downlink signals to the user equipment adopts a normal cyclic prefix and is a frame structure applicable to type 1 and type 2.

In the embodiment of the present invention, optionally, when the second determining module 630 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table F:

TABLE F

|  | Coordinated UE | First non-coordinated UE | Second non-coordinated UE |
| --- | --- | --- | --- |
| CSI-RS resource configuration sequence number | 20 21 22 | 3 4 5 | 0 1 2 | where, a frame structure used by the base station to send downlink signals to the user equipment adopts a normal cyclic prefix and is a frame structure applicable only to type 1.

In the embodiment of the present invention, optionally, when the second determining module 630 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table G:

TABLE G

|  | Coordinated UE | First non-coordinated UE | Second non-coordinated UE |
| --- | --- | --- | --- |
| CSI-RS resource configuration sequence number | 0 1 2 3 | 4 5 6 7 | 0 1 2 3 | where, a frame structure used by the base station to send downlink signals to the user equipment adopts an extended cyclic prefix and is a frame structure applicable to type 1 and type 2.

In the embodiment of the present invention, optionally, when the second determining module 630 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table H:

TABLE H

|  | Coordinated UE | First non-coordinated UE | Second non-coordinated UE |
| --- | --- | --- | --- |
| CSI-RS resource configuration sequence number | 20 21 22 | 23 24 25 | 20 21 22 | where, a frame structure used by the base station to send downlink signals to the user equipment adopts an extended cyclic prefix and is a frame structure applicable only to type 1.

Figure 12:
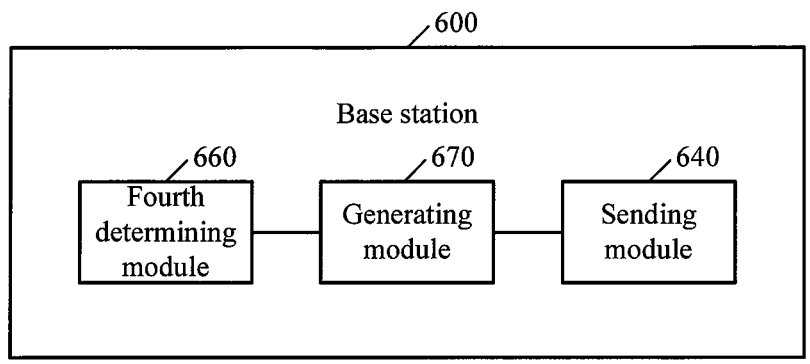
FIG. 12 is still another schematic block diagram of a base station according to an embodiment of the present invention.
Figure 13:
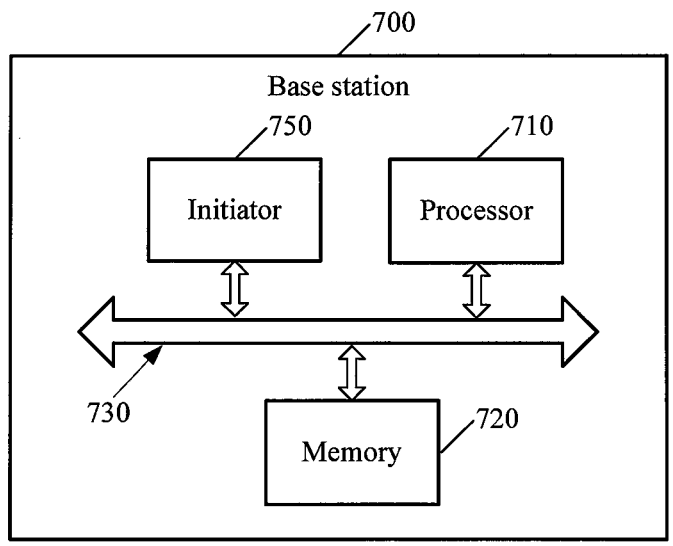
FIG. 13 is a schematic block diagram of a base station according to another embodiment of the present invention.

In the embodiment of the present invention, optionally, as shown in FIG. 12, the base station 600 further includes:

a fourth determining module 660, configured to determine an initial value of a CSI-RS sequence, where the initial value of the CSI-RS sequence is determined according to the following equation:

$$c_{init}=2^{10}\cdot(7\cdot(n_s+1)+l+1)\cdot(2\cdot X+1)+2\cdot X+N_{CP}$$

where, $c_{init}$ is the initial value of the CSI-RS sequence, $n_s$ is a radio frame slot number of a slot in which the CSI-RS sequence is located, l is an intra-slot number of an orthogonal frequency division multiplexing OFDM symbol in which the CSI-RS sequence is located, X is a non-negative integer, and $N_{CP}$ is 0 or 1; and a generating module 670, configured to generate a CSI-RS according to the initial value of the CSI-RS sequence that is determined by the fourth determining module 660, where:

the sending module 640 is further configured to send the CSI-RS generated by the generating module 670 to the user equipment.

The base station 600 according to the embodiment of the present invention may correspond to an execution body of the method for configuring a CSI-RS according to the embodiments of the present invention, and the foregoing and other operations and/or functions of each module in the base station 600 are respectively intended to implement a corresponding process of each method in FIG. 1 to FIG. 9, which, for brevity, are not repeatedly described herein.

Therefore, in the base station according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

In addition, the terms "system" and "network" are usually interchangeable herein. The term "and/or" in this document is only an association relationship for describing associated objects, and represents that three possible relationships may exist, for example, A and/or B may represent the following three cases: A exists separately, both A and B exist, and B exists separately. In addition, the character "/" in this document usually represents that associated objects before and after the symbol are in an "or" relationship.

It should be understood that, in the embodiments of the present invention, "B corresponding to A" means that B is correlated with A, and B can be determined according to A. However, it should be further understood that, determining B according to A does not necessarily refer to determining B according to A only, but may also refer to determining B according to A and/or other information.

As shown in FIG. 12, an embodiment of the present invention further provides a base station 700. The base station 700 includes a processor 710, a memory 720, a bus system 730, and an initiator 750. The processor 710, the memory 720, and the initiator 750 are connected through the bus system 730, the memory 720 is configured to store an instruction, and the processor 710 is configured to execute the instruction stored in the memory 720 to control the initiator 750 to send a signal. The processor 710 is configured to obtain location information of a user equipment; the processor 710 is further configured to determine, according to the location information, that the user equipment is located in a cross coverage area in which at least two nodes provide service, or in a centralized coverage area in which one node provides service; the processor 710 is further configured to: when it is determined that the user equipment is located in the cross coverage area, determine, according to transmitting capabilities of the at least two nodes and a receiving capability of the user equipment, the number of ports for sending downlink signals to the user equipment; and the initiator 750 is configured to send CSI-RS configuration information to the user equipment, where the CSI-RS configuration information includes the number of ports.

Therefore, in the base station according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

It should be understood that, in the embodiment of the present invention, the processor 710 may be a central processing unit (Central Processing Unit, CPU), or the processor 710 may also be another universal processor, a digital signal processor (DSP), an application-specific integrated circuit (ASIC), a field programmable gate array (FPGA) or another programmable logical component, a stand-alone gate or a transistor logical component, a stand-alone hardware component, or the like. The universal processor may be a microprocessor or any conventional processor or the like.

The memory 720 may include a read-only memory and a random access memory, and provide an instruction and data for the processor 710. A part of the memory 720 may further include a non-volatile random access memory. For example, the memory 720 may further store information about a device type.

The bus system 730 not only includes a data bus, but may also include a power supply bus, a control bus, a state signal bus, and the like. However, for clarity, all kinds of buses are uniformly called the bus system 730 in the accompanying drawings.

In the implementation process, the steps of the method may be implemented by integrated logic circuits of hardware in the processor 710 or by software instructions. The steps of the method disclosed in the embodiments of the present invention may be executed by a hardware processor directly, or by a combination of hardware and software modules in the processor. The software modules may reside in a random access memory, a flash memory, a read-only memory, a programmable read-only memory, an electrically erasable programmable memory, a register, or any other storage medium that is mature in the art. The storage medium is located in the memory 720, and the processor 710 reads information in the memory 720, and works together with its hardware to implement the steps of the method. To avoid repetition, details are not described herein.

Optionally, in an embodiment, the determining, by the processor 710, the number of ports for sending downlink signals to the user equipment includes: when it is determined that the user equipment is located in the centralized coverage area, determining, according to a transmitting capability of the node that provides service in the centralized coverage area, the number of ports for sending downlink signals to the user equipment.

Optionally, in an embodiment, the processor 710 is further configured to: determine a CSI-RS resource configuration sequence number of the user equipment according to a resource that is configured for a coordinated user equipment and is multiplexed into a resource configured for a first non-coordinated user equipment and a second non-coordinated user equipment, where the user equipment belongs to the coordinated user equipment, the first non-coordinated user equipment, or the second non-coordinated user equipment, the coordinated user equipment includes the user equipment located in the cross coverage area in which a first node and a second node provide service, the first non-coordinated user equipment includes the user equipment located in the centralized coverage area in which the first node provides service, and the second non-coordinated user equipment includes the user equipment located in the centralized coverage area in which the second node provides service.

That the initiator 750 is configured to send CSI-RS configuration information to the user equipment specifically includes: sending the CSI-RS configuration information to the user equipment, where the CSI-RS configuration information further includes the CSI-RS resource configuration sequence number of the user equipment.

Optionally, in an embodiment, when the user equipment belongs to the first non-coordinated user equipment or the second non-coordinated user equipment, the processor 710 is further configured to: when mapping a data signal of the first non-coordinated user equipment, perform a zeroing operation for power of the data signal of the first non-coordinated user equipment on a resource element RE that bears a CSI-RS of the second non-coordinated user equipment; and, when mapping a data signal of the second non-coordinated user equipment, perform a zeroing operation for power of the data signal of the second non-coordinated user equipment on an RE that bears a CSI-RS of the first non-coordinated user equipment.

Optionally, in an embodiment, when the processor 710 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table A, where a frame structure for sending downlink signals to the user equipment adopts a normal cyclic prefix and is a frame structure applicable to type 1 and type 2.

Optionally, in an embodiment, when the processor 710 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table B, where a frame structure for sending downlink signals to the user equipment adopts a normal cyclic prefix and is a frame structure applicable only to type 1.

Optionally, in an embodiment, when the processor 710 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table C, where a frame structure for sending downlink signals to the user equipment adopts an extended cyclic prefix and is a frame structure applicable to type 1 and type 2.

Optionally, in an embodiment, when the processor 710 determines that the number of ports for sending downlink signals to the coordinated user equipment is 4, and determines that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table D, where a frame structure for sending downlink signals to the user equipment adopts an extended cyclic prefix and is a frame structure applicable only to type 1.

Optionally, in an embodiment, when the processor 710 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table E, where a frame structure for sending downlink signals to the user equipment adopts a normal cyclic prefix and is a frame structure applicable to type 1 and type 2.

Optionally, in an embodiment, when the processor 710 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table F, where a frame structure for sending downlink signals to the user equipment adopts a normal cyclic prefix and is a frame structure applicable only to type 1.

Optionally, in an embodiment, when the processor 710 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table G; where a frame structure for sending downlink signals to the user equipment adopts an extended cyclic prefix and is a frame structure applicable to type 1 and type 2.

Optionally, in an embodiment, when the processor 710 determines that the number of ports for sending downlink signals to the coordinated user equipment is 8, and determines that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table H, where a frame structure for sending downlink signals to the user equipment adopts an extended cyclic prefix and is a frame structure applicable only to type 1.

Optionally, in an embodiment, the processor 710 is further configured to:

determine an initial value of a CSI-RS sequence, where the initial value of the CSI-RS sequence is determined according to the following equation:

$$c_{init}=2^{10}\cdot(7\cdot(n_s+1)+l+1)\cdot(2\cdot X+1)+2\cdot X+N_{CP}$$

where, $c_{init}$ is the initial value of the CSI-RS sequence, $n_s$ is a radio frame slot number of a slot in which the CSI-RS sequence is located, l is an intra-slot number of an orthogonal frequency division multiplexing OFDM symbol in which the CSI-RS sequence is located, X is a non-negative integer, and $N_{CP}$ is 0 or 1; and generate a CSI-RS according to the initial value of the CSI-RS sequence, where:

the initiator 750 is further configured to send the CSI-RS to the user equipment.

It should be understood that, the base station 700 according to the embodiments of the present invention may correspond to a base station 600 according to the embodiments of the present invention and an entity for executing the method for configuring a CSI-RS according to the embodiments of the present invention, and the foregoing and other operations and/or functions of each module in the base station 600 are respectively intended to implement a corresponding process of each method in FIG. 1 to FIG. 9, which, for brevity, are not repeatedly described herein.

Therefore, in the base station according to the embodiment of the present invention, when it is determined that a user equipment is located in a cross coverage area, the number of ports for sending downlink signals to the user equipment is determined according to transmitting capabilities of at least two nodes that provide the cross coverage area for the user equipment and a receiving capability of the user equipment, so that the different number of transmitting antennas can be configured for a different user equipment in a system, which can further improve throughput and enhance coverage and user experience.

A person of ordinary skill in the art can be aware that, units and algorithm steps described in combination with the embodiments disclosed in this specification can be implemented by electronic hardware, computer software, or a combination of the two. To clearly describe interchangeability between the hardware and the software, the foregoing has generally described compositions and steps of the examples according to functions. Whether these functions are performed by hardware or software depends on particular applications and design constraint conditions of the technical solutions. A person skilled in the art may use different methods to implement the described functions for each particular application, but it should not be considered that the implementation goes beyond the scope of the present invention.

A person skilled in the art can clearly understand that, for the purpose of convenient and brief description, for a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

According to descriptions of the foregoing implementation manners, a person skilled in the art can clearly understand that the present invention may be implemented by hardware, firmware, or a combination of the two. When the present invention is implemented by software, the functions may be stored in a computer-readable medium or may be transmitted as one or more instructions or codes on the computer-readable medium. The computer-readable medium includes a computer storage medium and a communications medium, where the communications medium includes any medium that facilitates transfer of computer programs from one place to another. The storage medium may be any available medium that is accessible by a computer. Examples of the computer-readable medium include but are not limited to: a RAM, a ROM, an EEPROM, a CD-ROM, or other optical disc storage media or magnetic disk storage media or other magnetic storage devices, or any other computer-accessible media that can be used to carry or store expected program codes in an instruction form or in a data structure form. In addition, any connection may appropriately become a computer-readable medium. For example, if software is transmitted from a website, a server or another remote source by using a coaxial cable, an optical cable, a twisted pair, or a digital subscriber line (DSL), or by using a radio technology, such as infrared transmission, radio transmission, and microwave transmission, then the coaxial cable, or optical cable, or twisted pair, or DSL, or the radio technology, such as infrared transmission, radio transmission, and microwave transmission, is included in a fixation of the medium. As used in the present invention, disks (Disk) and discs (disc) include a compact disc (CD), a laser disc, an optical disc, digital versatile disk (DVD), a floppy disk, and a Blu-ray disc. Generally, the disk copies data magnetically, and the disc copies data optically by using laser. Combinations of them shall also fall within the protection scope of the computer-readable medium.

In conclusion, the foregoing descriptions are merely exemplary embodiments of the technical solutions of the present invention, but are not intended to limit the protection scope of the present invention. Any modifications, equivalent replacements, or improvements made within the spirit and principle of the present invention shall fall within the protection scope of the present invention.

What is claimed is:

1. A method for configuring a channel state information reference signal, the method comprising:
   obtaining location information of a user equipment;
   determining, according to the location information, that the user equipment is located in a cross coverage area in which at least two nodes provide service, or in a centralized coverage area in which one node provides service;
   when it is determined that the user equipment is located in the cross coverage area, determining, according to transmitting capabilities of the at least two nodes and a receiving capability of the user equipment, the number of ports for sending downlink signals to the user equipment;
   sending Channel State Information Reference Signal (CSI-RS) configuration information to the user equipment, wherein the CSI-RS configuration information comprises the number of ports;
   determining a CSI-RS resource configuration sequence number of the user equipment according to a resource that is configured for a coordinated user equipment and is multiplexed into a resource configured for a first non-coordinated user equipment and a second non-coordinated user equipment, wherein the user equipment belongs to the coordinated user equipment, the first non-coordinated user equipment, or the second non-coordinated user equipment, the coordinated user equipment comprises the user equipment located in the cross coverage area in which a first node and a second node provide service, the first non-coordinated user equipment comprises the user equipment located in the centralized coverage area in which the first node provides service, and the second non-coordinated user equipment comprises the user equipment located in the centralized coverage area in which the second node provides service; and
   wherein sending CSI-RS configuration information to the user equipment comprises:
      sending the CSI-RS configuration information to the user equipment, wherein the CSI-RS configuration information further comprises the CSI-RS resource configuration sequence number of the user equipment.

2. The method according to claim 1, wherein determining the number of ports for sending downlink signals to the user equipment comprises:
   when it is determined that the user equipment is located in the centralized coverage area, determining, according to a transmitting capability of the node that provides service in the centralized coverage area, the number of ports for sending downlink signals to the user equipment.

3. The method according to claim 1, wherein, when the user equipment belongs to the first non-coordinated user equipment or the second non-coordinated user equipment, the method further comprises:
when mapping a data signal of the first non-coordinated user equipment, performing a zeroing operation for power of the data signal of the first non-coordinated user equipment on a resource element (RE) that bears a CSI-RS of the second non-coordinated user equipment; and
when mapping a data signal of the second non-coordinated user equipment, performing a zeroing operation for power of the data signal of the second non-coordinated user equipment on an RE that bears a CSI-RS of the first non-coordinated user equipment.

4. The method according to claim 1, wherein, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table A:

TABLE A

| | Coordinated UE | First non-coordinated UE | Second non-coordinated UE |
|---|---|---|---|
| CSI-RS resource configuration sequence number | 0 | 0 | 10 |
| | 1 | 1 | 12 |
| | 2 | 2 | 14 |
| | 3 | 3 | 16 |
| | 4 | 4 | 18 |
| | 5 | 5 | 11 |
| | 6 | 6 | 13 |
| | 7 | 7 | 15 |
| | 8 | 8 | 17 |
| | 9 | 9 | 19 | wherein, a frame structure for sending downlink signals to the user equipment adopts a normal cyclic prefix and is a frame structure applicable to type 1 and type 2.

5. The method according to claim 1, wherein, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table B:

TABLE B

| | Coordinated UE | First non-coordinated UE | Second non-coordinated UE |
|---|---|---|---|
| CSI-RS resource configuration sequence number | 20 | 26 | 20 |
| | 21 | 28 | 21 |
| | 22 | 30 | 22 |
| | 23 | 27 | 23 |

TABLE B-continued

| | Coordinated UE | First non-coordinated UE | Second non-coordinated UE |
|---|---|---|---|
| | 24 | 29 | 24 |
| | 25 | 31 | 25 | wherein, a frame structure for sending downlink signals to the user equipment adopts a normal cyclic prefix and is a frame structure applicable only to type 1.

6. The method according to claim 1, wherein, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table C:

TABLE C

| | Coordinated UE | First non-coordinated UE | Second non-coordinated UE |
|---|---|---|---|
| CSI-RS resource configuration sequence number | 0 | 0 | 8 |
| | 1 | 1 | 9 |
| | 2 | 2 | 12 |
| | 3 | 3 | 13 |
| | 4 | 4 | 10 |
| | 5 | 5 | 11 |
| | 6 | 6 | 14 |
| | 7 | 7 | 15 | wherein, a frame structure for sending downlink signals to the user equipment adopts an extended cyclic prefix and is a frame structure applicable to type 1 and type 2.

7. The method according to claim 1, wherein, when it is determined that the number of ports for sending downlink signals to the coordinated user equipment is 4, and it is determined that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table D:

TABLE D

| | Coordinated UE | First non-coordinated UE | Second non-coordinated UE |
|---|---|---|---|
| CSI-RS resource configuration sequence number | 20 | 20 | 26 |
| | 21 | 21 | 27 |
| | 22 | 22 | 28 |
| | 23 | 23 | 29 |
| | 24 | 24 | 30 |
| | 25 | 25 | 31 | wherein, a frame structure for sending downlink signals to the user equipment adopts an extended cyclic prefix and is a frame structure applicable only to type 1.

8. The method according to claim 1, wherein, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table E:

TABLE E

|  | Coordinated UE | First non-coordinated UE | Second non-coordinated UE |
| --- | --- | --- | --- |
| CSI-RS resource configuration sequence number | 0 | 5 | 0 |
|  | 1 | 6 | 1 |
|  | 2 | 7 | 2 |
|  | 3 | 8 | 3 |
|  | 4 | 9 | 4 | wherein, a frame structure for sending downlink signals to the user equipment adopts a normal cyclic prefix and is a frame structure applicable to type 1 and type 2.

9. The method according to claim 1, wherein, when it is determined that the number of ports for sending downlink signals to the coordinated user equipment is 8, and it is determined that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table F:

TABLE F

|  | Coordinated UE | First non-coordinated UE | Second non-coordinated UE |
| --- | --- | --- | --- |
| CSI-RS resource configuration sequence number | 20 | 3 | 0 |
|  | 21 | 4 | 1 |
|  | 22 | 5 | 2 | wherein, a frame structure for sending downlink signals to the user equipment adopts a normal cyclic prefix and is a frame structure applicable only to type 1.

10. A base station, comprising:
a processor;
memory coupled to the processor, the memory comprising instructions that, when executed by the processor, cause the base station to:
obtain location information of a user equipment;
determine, according to the obtained location information, that the user equipment is located in a cross coverage area in which at least two nodes provide service, or in a centralized coverage area in which one node provides service;
in response to determining that the user equipment is located in the cross coverage area, determine, according to transmitting capabilities of the at least two nodes and a receiving capability of the user equipment, a number of ports for sending downlink signals to the user equipment;
send Channel State Information Reference Signal (CSI-RS) configuration information to the user equipment, wherein the CSI-RS configuration information comprises the determined number of ports;
determine a CSI-RS resource configuration sequence number of the user equipment according to a resource that is configured for a coordinated user equipment and is multiplexed into a resource configured for a first non-coordinated user equipment and a second non-coordinated user equipment, wherein the user equipment belongs to the coordinated user equipment, the first non-coordinated user equipment, or the second non-coordinated user equipment, the coordinated user equipment comprises the user equipment located in the cross coverage area in which a first node and a second node provide service, the first non-coordinated user equipment comprises the user equipment located in the centralized coverage area in which the first node provides service, and the second non-coordinated user equipment comprises the user equipment located in the centralized coverage area in which the second node provides service; and
send the CSI-RS configuration information to the user equipment, wherein the CSI-RS configuration information further comprises the determined CSI-RS resource configuration sequence number of the user equipment.

11. The base station according to claim 10, wherein the memory further comprises instructions that, when executed by the processor, cause the base station to: in response to determining that the user equipment is located in the centralized coverage area, determine, according to a transmitting capability of the node that provides service in the centralized coverage area, the number of ports for sending downlink signals to the user equipment.

12. The base station according to claim 10, wherein, when the user equipment belongs to the first non-coordinated user equipment or the second non-coordinated user equipment, the memory further comprises instructions that, when executed by the processor, cause the base station to:
when mapping a data signal of the first non-coordinated user equipment, perform a zeroing operation for power of the data signal of the first non-coordinated user equipment on a resource element (RE) that bears a CSI-RS of the second non-coordinated user equipment; and
when mapping a data signal of the second non-coordinated user equipment, perfoim a zeroing operation for power of the data signal of the second non-coordinated user equipment on an RE that bears a CSI-RS of the first non-coordinated user equipment.

13. The base station according to claim 10, wherein, when determining that the number of ports for sending downlink signals to the coordinated user equipment is 4, and determining that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table A:

TABLE A

|  | Coordinated UE | First non-coordinated UE | Second non-coordinated UE |
| --- | --- | --- | --- |
| CSI-RS resource configuration sequence number | 0 | 0 | 10 |
|  | 1 | 1 | 12 |
|  | 2 | 2 | 14 |
|  | 3 | 3 | 16 |
|  | 4 | 4 | 18 |
|  | 5 | 5 | 11 |
|  | 6 | 6 | 13 |
|  | 7 | 7 | 15 |
|  | 8 | 8 | 17 |
|  | 9 | 9 | 19 | wherein, a frame structure used by the base station to send downlink signals to the user equipment adopts a normal cyclic prefix and is a frame structure applicable to type 1 and type 2.

14. The base station according to claim 10, wherein, when determining that the number of ports for sending downlink signals to the coordinated user equipment is 4, and determining that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table B:

TABLE B

|  | Coordinated UE | First non-coordinated UE | Second non-coordinated UE |
| --- | --- | --- | --- |
| CSI-RS resource configuration sequence number | 20 | 26 | 20 |
|  | 21 | 28 | 21 |
|  | 22 | 30 | 22 |
|  | 23 | 27 | 23 |
|  | 24 | 29 | 24 |
|  | 25 | 31 | 25 | wherein, a frame structure used by the base station to send downlink signals to the user equipment adopts a normal cyclic prefix and is a frame structure applicable only to type 1.

15. The base station according to claim 10, wherein, when determining that the number of ports for sending downlink signals to the coordinated user equipment is 4, and determining that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table C:

TABLE C

|  | Coordinated UE | First non-coordinated UE | Second non-coordinated UE |
| --- | --- | --- | --- |
| CSI-RS resource configuration sequence number | 0 | 0 | 8 |
|  | 1 | 1 | 9 |
|  | 2 | 2 | 12 |
|  | 3 | 3 | 13 |

TABLE C-continued

|  | Coordinated UE | First non-coordinated UE | Second non-coordinated UE |
| --- | --- | --- | --- |
|  | 4 | 4 | 10 |
|  | 5 | 5 | 11 |
|  | 6 | 6 | 14 |
|  | 7 | 7 | 15 | wherein, a frame structure used by the base station to send downlink signals to the user equipment adopts an extended cyclic prefix and is a frame structure applicable to type 1 and type 2.

16. The base station according to claim 10, wherein, when determining that the number of ports for sending downlink signals to the coordinated user equipment is 4, and determining that the number of ports for sending downlink signals to the first non-coordinated user equipment and the second non-coordinated user equipment is 2, correspondence between a CSI-RS resource configuration sequence number of the coordinated user equipment and CSI-RS resource configuration sequence numbers of the first non-coordinated user equipment and the second non-coordinated user equipment is determined according to Table D:

TABLE D

|  | Coordinated UE | First non-coordinated UE | Second non-coordinated UE |
| --- | --- | --- | --- |
| CSI-RS resource configuration sequence number | 20 | 20 | 26 |
|  | 21 | 21 | 27 |
|  | 22 | 22 | 28 |
|  | 23 | 23 | 29 |
|  | 24 | 24 | 30 |
|  | 25 | 25 | 31 | wherein, a frame structure used by the base station to send downlink signals to the user equipment adopts an extended cyclic prefix and is a frame structure applicable only to type 1.

17. The base station according to claim 10, wherein, when determining that the number of ports for sending downlink signals to the coordinated user equipment is 8, and determining that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table E:

TABLE E

|  | Coordinated UE | First non-coordinated UE | Second non-coordinated UE |
| --- | --- | --- | --- |
| CSI-RS resource configuration sequence number | 0 | 5 | 0 |
|  | 1 | 6 | 1 |
|  | 2 | 7 | 2 |
|  | 3 | 8 | 3 |
|  | 4 | 9 | 4 | wherein, a frame structure for sending downlink signals to the user equipment adopts a normal cyclic prefix and is a frame structure applicable to type 1 and type 2.

18. The base station according to claim 10, wherein, when determining that the number of ports for sending downlink signals to the coordinated user equipment is 8, and determining that the number of ports for sending downlink signals to the first non-coordinated user equipment and the second non-coordinated user equipment is 4, correspondence between a CSI-RS resource configuration sequence number of the coordinated user equipment and CSI-RS resource configuration sequence numbers of the first non-coordinated user equipment and the second non-coordinated user equipment is determined according to Table F:

TABLE F

|  | Coordinated UE | First non-coordinated UE | Second non-coordinated UE |
| --- | --- | --- | --- |
| CSI-RS resource configuration sequence number | 20 | 3 | 0 |
|  | 21 | 4 | 1 |
|  | 22 | 5 | 2 | wherein, a frame structure used by the base station to send downlink signals to the user equipment adopts a normal cyclic prefix and is a frame structure applicable only to type 1.

* * * * *